April 30, 1940. P. J. WALSH 2,199,121
CONVERTER SYSTEM
Filed Jan. 18, 1938
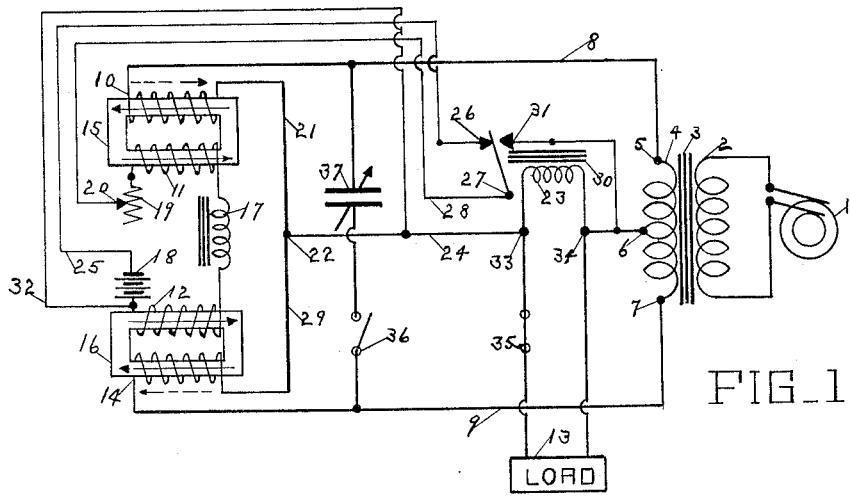
FIG_1_
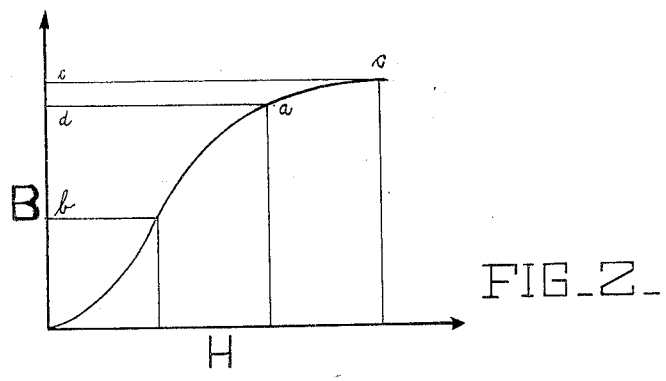
FIG_2_
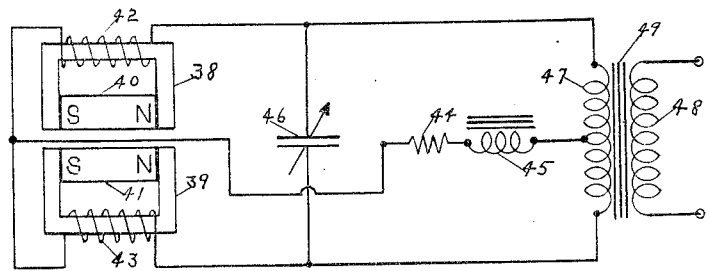
FIG_3_
INVENTOR.
Philip J. Walsh Patented Apr. 30, 1940

2,199,121

UNITED STATES PATENT OFFICE 2,199,121

CONVERTER SYSTEM

Philip John Walsh, San Francisco, Calif.

Application January 18, 1938, Serial No. 185,528

6 Claims. (Cl. 175—363)

This invention relates to a system for converting alternating current into direct current.

In connection with electrochemical processes, arc welding, radio transmitters and receivers, and many other devices, the electric power is usually supplied as alternating current which must be changed to direct current before it can be utilized. At the present time this is done by means of rectifiers, heavy motor-generators or other mechanical moving contactors.

It has been found that such rectifiers are expensive, inefficient and must be renewed frequently, and in electrochemical processes where direct currents of several thousand amperes are employed, the heavy motor driven generator is practically the only means of converting alternating current power into direct current.

It is one of the objects of my invention to obviate these disadvantages, and to provide a simple scheme for obtaining a high degree of efficiency.

It is another object of my invention to obtain this high degree of efficiency without the use of moving parts.

It is still another object of my invention to provide an inexpensive converter system that operates over a long period of time without attention.

My invention possesses many other advantages and has other objects which may be made more easily apparent from a consideration of one embodiment of my invention. For this purpose, I have shown a few forms in the drawing accompanying and forming part of the present specification. I shall now proceed to describe these forms in detail, which illustrates the general principles of my invention; but it is to be understood that this detailed description is not to be taken in a limiting sense, since the scope of my invention is best defined by the appended claims.

Referring to the drawing:

Figure 1 is a schematic wiring diagram of one form of my invention;

Figure 2 is a diagram for facilitating explanation of the invention;

Figure 3 is a wiring diagram of a still further modification.

I show a source of alternating current 1 which may be an alternator or any other source of current, connected to the primary coil 2, of a transformer comprising the coils 2 and 4 wound on the iron core 3. The secondary coil 4 has the two end terminals 5 and 7 and a center tap 6. Alternating current flowing in the primary coil 2 causes an electromotive force to be induced in the secondary coil 4 by transformer action. Since the operation of such a transformer is now well understood further detailing thereof is unessential, except to point out that during one half cycle when terminal 5 is positive and terminal 7 negative, tap 6 is negative relative to terminal 5 and positive relative to terminal 7. But during the other half of the cycle when terminal 5 is negative and terminal 7 positive, tap 6 is positive relative to terminal 5 and negative relative to terminal 7.

When terminal 5 is positive current flows through the circuit made up of connection 8, coil 10 wound on the core of magnetic material 15, connection 21, coil 14 wound on the core of magnetic material 16 and connection 9 back to the negative terminal 7. The current flows in the opposite direction in this circuit when terminal 7 is positive and terminal 5 negative, that is, from terminal 7, connection 9, coil 14, connections 29 and 21, coil 10 and connection 8 back to the negative terminal 5. The coils 10 and 14 are made of the same number of turns and have substantially the same impedance. Now it is seen that without means to unbalance these equal coils there is no difference of potential between tap 6 and point 22, and therefore no current flow between these two points. As the description proceeds I will explain how the coils 10 and 14 are made to unbalance the circuit during each half cycle so that current flows, in one direction only, from tap 6 through coil 23 and connection 24 to point 22.

The field coils 11 and 12 wound on the cores 15 and 16 respectively, are for the purpose of polarizing the cores. Current from the battery 18 flows through connection 25, contact 26, arm 27, connection 28, arm 20, resistor 19, coil 11, choke coil 17, coil 12 and back to battery 18.

This current flowing in the coils 11 and 12 sets up a magnetic flux in the cores 15 and 16 in the direction of the full line arrows. The strength of this current, that is, the magnetizing force expressed in ampere turns and the resulting magnetization or magnetic flux through the cores can be controlled by adjusting the resistor 19.

In Figure 2, I show a typical "B–H" curve for iron, which shows the relation between the magnetizing force H, and the resulting magnetic flux B, through the core. It is seen that B increases as H is increased up to the point c, on the curve, after which any further increase in H has little effect on B. This is known as the saturation point—the iron becomes magnetically saturated.

If the magnetization of the iron is brought to the point *a* on the curve, by adjustment of resistor 19, equal increments and decrements added to the magnetizing force (caused by alternating current flowing in the coil 10 or coil 14) cause the magnetic flux in the core to increase during the positive half of the cycle by the small amount *c—d* on the curve. But during the negative half of the cycle the magnetic flux in the core will be reduced by the considerably larger amount *a—b*. Now it is apparent that by proper adjustment of resistor 9, Figure 1, the cores 15 and 16 can be magnetically saturated by the current flowing in the coils 11 and 12. Under such circumstances current flowing in coil 10 or in coil 14 in such a direction as to further magnetize the core can cause substantially no change in the magnetic flux therein; but when current flows in either coil 10 or coil 14 in the opposite direction, tending to demagnetize the core, there is a large change in the strength of the magnetic flux in the core.

It thus comes about that during the positive half cycle coil 10 acts like a coil wound on an iron core while coil 14 acts like a coil without an iron core. During the negative half of the cycle the actions are reversed, that is, coil 14 acts like a coil with an iron core while coil 10 acts like a coil without an iron core. The choke coil 17 which does not oppose the flow of direct current through itself from the battery 18, offers an extremely high impedance to alternating currents induced in the coils 11 and 12 by the variations in the magnetic flux in the cores 15 and 16, and thus substantially prevents the flow of alternating current through the battery 18.

When the cores 15 and 16 are properly polarized by direct current flowing in the coils 11 and 12, the circuit including the coils 10 and 14 is no longer balanced, and therefore a difference of potential exists between tap 6 and point 22. Because now when terminal 5 is positive and terminal 7 negative during one half cycle, current flows through coil 10 in a direction tending to demagnetize the core 15, thus causing a large change in the magnetic flux therein. As this current builds up from zero to maximum the flux is reduced from its normal value to its minimum value, and when this current gradually falls away to zero, the flux builds up to its normal steady value. This change in the flux causes a counter electromotive force to be induced in the coil 10 in such a direction as to oppose the flow of current therethrough. But the current flowing through the coil 14 tends to further magnetize the core, and therefore there is substantially no change in the magnetic flux, and substantially no counter electromotive force generated to oppose the flow of current therein. Now as tap 6 is also positive relative to terminal 7 current flows from tap 6 through coil 23, connection 24 to point 22, connection 29, through coil 14 in a direction tending to further magnetize the core 16, connection 9 and back to the negative terminal 7.

During the other half of the cycle when terminal 7 is positive and terminal 5 negative, current flows from terminal 7, connection 9, coil 14 now in a direction tending to demagnetize the core 16, connections 29 and 21, through coil 10 now in a direction tending to further magnetize the core 15, connection 8 and back to the negative terminal 5. Thus the current flowing in coil 14 generates a counter electromotive force which opposes it, but substantially no opposing force is generated in coil 10. At the same time tap 6 is positive relative to terminal 5 and current flows from tap 6 through coil 23, connection 24 to point 22 in the same direction as before, connection 21, through coil 10 in a direction tending to further magnetize the core, connection 8 and back to the negative terminal 5.

Thus it is seen that during each cycle two half waves of current flow from point 6 to point 22 in one direction only, which constitutes a direct current. Also that this current is always flowing in such a direction through either the coil 10 or the coil 14 as to tend to further magnetize the cores, thus no opposing force is generated.

When the direct current flowing through the coil 23 builds up to a predetermined value, the relay arm 27 snaps over rapidly from the contact 26 to the contact 31. This relay is arranged for fast snap-action and is held in the position shown by a spring, the arm 27 is drawn over to the other position by the magnetic pull of core 30 when current flows in the coil 23. When the arm snaps into contact with contactor 31, the battery 18 is cut out of the circuit and direct current flows from tap 6, contactor 31, relay arm 27, connection 28, resistor arm 20, resistor 19, coil 11, choke coil 17, coil 12, connection 32, connection 24 to point 22. The coil 23 is connected across the direct current output terminals 33 and 34. The battery 18 is used for starting purposes only and any other convenient source of direct current can be used for this purpose instead of the battery. When switch 35 is closed, the direct current load 13 is connected to the output terminals 33 and 34 as shown.

The coils 10 and 14 are designed to have a high inductive reactance and low resistance so as to reduce the flow of circulating current, through both coils 10 and 14, between the terminals 5 and 7, and thus increase the efficiency of the system. This circulating current can be further reduced, to value that is vanishingly small, by means of the condenser 37. The capacity reactance of condenser 37 is made equal to the inductive reactance of the coils 10 and 14 connected as shown, so that when switch 36 is closed, the condenser 37 cooperates with the coils 10 and 14 to form a parallel resonant circuit between the terminals 5 and 7.

I will now explain how the condenser 37 cooperates with the coils 10 and 14 to oppose the flow of circulating current through the circuit connected between the terminals 5 and 7.

Let us assume that at this instant the condenser 37 is fully charged, and in such a direction as to make its upper terminal positive and its lower terminal negative. With the switch 36 closed, condenser 37 discharges through the path, coil 10, connections 21 and 29, coil 14, connection 9, switch 36 and back to condenser 37, in the direction indicated by the broken line arrows. This current flowing in the coil 10 reduces the strength of the magnetic flux in the core 15 but has substantially no effect on the flux in core 16 because it flows in a direction through coil 14 tending to further magnetize the core 16.

As the flux in core 15 builds up to its normal steady value it causes an electromotive force to be induced in the coil 10 of such a direction as to send a current through the path, coil 10, connections 21 and 29, coil 14, connection 9, switch 36, condenser 37 and connection 8 to coil 10, in the direction indicated by the broken line arrows and charge the condenser in the opposite direction making its lower terminal positive and its upper terminal negative. Now condenser 37 discharges through the path, switch 36, connection 9, coil 14, connections 29 and 21, coil 10, connection 8 and condenser 37 in the opposite direction, that is, in a direction opposed to the broken line arrows. This current flowing in the coil 14 reduces the flux strength in the core 16 but has substantially no effect on the flux in the core 15 because it flows in a direction through coil 10 which tends to further magnetize the core 15. As the flux in the core 16 builds back up again to its normal value it causes an electromotive force to be induced in coil 14 which sends a current in a direction opposed to the broken line arrows through the path, coil 14, connections 29 and 21, coil 10, connection 8, condenser 37, switch 36, and coil 14, and charges condenser 37 in the opposite direction, that is, making its upper terminal positive and its lower terminal negative.

Thus while condenser 37 is cooperating with one of the coils 10 or 14 to form a parallel resonant circuit to oppose the flow of circulating current through the circuit between the terminals 5 and 7, current flows without opposition from tap 6 and through the other coil to one of the terminals 5 or 7. The phase relations by proper connection could readily be shown to be such as to affect this result. Since the operation of a parallel resonant circuit is now well understood further detailing thereof is unessential, except to state that at any instant a voltage is set up by either the condenser or the coil that is substantially equal to, and opposed to, the applied voltage.

When the system is operating from a commercial 60 cycle alternating current source and producing direct currents of several thousand amperes, the coils 10 and 14 can be made of a few turns of heavy copper conductor wound on relatively large cores, and the capacity of condenser 37 can be made such that its capacity reactance is equal to the effective inductive reactance of the coils connected as shown.

The cores 15 and 16 can be made of iron, nickel, permalloy or other magnetic material, and when the device is operating at high frequency, they can be made of finely divided particles of these materials mixed with a binder and pressed into the desired shape. The cores can be polarized by means of permanent magnets instead of the magnetizing coils 11 and 12.

In Figure 3, the cores 38 and 39 made of magnetic material can be clamped onto the permanent magnets 40 and 41 having north N, and south S, poles as shown in the drawing. The operation of this form of the invention is practically the same as the form shown in Fig. 1, except that the starting source such as battery 18, and the coils 11 and 12, are not necessary. The condenser 46 and the coils 42 and 43 operate in the same manner as the condenser 37 and the coils 10 and 14 of Fig. 1. The input transformer comprising the coils 47 and 48 wound on the core 49, corresponds to the coils 4 and 2 wound on the core 3 of Fig. 1.

This form of the invention is best adapted to operate at high frequency, or at high voltage where a small current represents a large power value.

The condensers 37 and 46 can be made variable so that they can be adjusted to the point of most efficient operation.

The direct current load circuit shown as the coil 45 and the resistor 44 corresponds to the direct current load 13 of Fig. 1.

I claim:

1. In a parallel resonant circuit having a pair of coils wound on cores of magnetic material, the coils being connected together and shunted by a condenser, the process which comprises magnetizing the cores in such a direction as to cause substantially only one of the coils to act as an inductance and cooperate with said condenser to form a parallel resonant circuit and the other coil to act substantially as a resistance during a part of each cycle, and reversing the actions of both coils during the remainder of each cycle.

2. The system as set forth in claim 1, with the addition of means including a permanent magnet for magnetizing the core.

3. In combination means forming a parallel resonant circuit comprising coils wound on cores of magnetic material, the coils being connected together and shunted by a condenser, and means for magnetically polarizing said cores associated and cooperating therewith whereby the current surging between said condenser and the coils causes the electrical properties of each coil to vary simultaneously oppositely to the other coil.

4. In a converter, two coils wound on magnetized cores, a connection between said coils, a condenser bridging said coils, an alternating current input circuit having a center tap, connections from the ends of said coils to said input circuit, a direct current load circuit connected between the center tap and the connection between said coils, the process which comprises magnetizing the cores in such a direction as to cause the coils to cooperate with the condenser to form a parallel resonant circuit to prevent the flow of a substantial circulating current from said input circuit, while allowing current to flow from said center tap through the coils.

5. The system as set forth in claim 4, with the addition of a permanent magnet for magnetizing the core.

6. A converter system comprising an A. C. potential source having a center tap, a pair of saturable-core reactors connected in series across said source, a load circuit connected between the junction of said reactors and said center tap, means for magnetically saturating the cores of said reactors in opposite senses with respect to series currents flowing in said reactors, and a capacitance connected across both of said reactors.

PHILIP JOHN WALSH.